(12) United States Patent
Shen

(10) Patent No.: US 8,149,572 B2
(45) Date of Patent: Apr. 3, 2012

(54) LIQUID CRYSTAL DISPLAY WITH A HEIGHT ADJUSTABLE BASE FOR THE PANEL THEREOF

(75) Inventor: Hsiu-Mei Shen, Hsin Tien (TW)

(73) Assignee: United Fu Shen Chen Technology Corp., New Taipei (TW)

(*) Notice: Subject to any disclaimer, the term of this patent is extended or adjusted under 35 U.S.C. 154(b) by 333 days.

(21) Appl. No.: 12/545,725

(22) Filed: Aug. 21, 2009

(65) Prior Publication Data

US 2010/0309403 A1 Dec. 9, 2010

(30) Foreign Application Priority Data

Jun. 3, 2009 (TW) .............................. 98209727 U

(51) Int. Cl.
*G06F 1/16* (2006.01)

(52) U.S. Cl. ................. 361/679.01; 248/349.1; 248/920; 349/60

(58) Field of Classification Search .............. 349/58, 349/60; 361/679.01; 248/146, 149, 349.1, 248/917–924
See application file for complete search history.

(56) References Cited

U.S. PATENT DOCUMENTS

| | | | | |
|---|---|---|---|---|
| 4,834,329 A * | 5/1989 | Delapp | ...................... | 248/183.3 |
| 6,134,103 A * | 10/2000 | Ghanma | .................. | 361/679.05 |
| 6,262,885 B1 * | 7/2001 | Emma et al. | ............. | 361/679.05 |
| 6,381,125 B1 * | 4/2002 | Mizoguchi et al. | ...... | 361/679.08 |
| 6,532,147 B1 * | 3/2003 | Christ, Jr. | .................. | 361/679.27 |
| 6,995,813 B2 * | 2/2006 | Shin | ................................. | 349/58 |
| 7,599,181 B2 * | 10/2009 | Chuang et al. | ........... | 361/679.55 |
| 7,876,392 B2 * | 1/2011 | Shen | ............................... | 349/60 |
| 7,988,113 B2 * | 8/2011 | Yang et al. | ................. | 248/276.1 |
| 2004/0125549 A1 * | 7/2004 | Iredale | .......................... | 361/681 |
| 2006/0158578 A1 * | 7/2006 | Tsuo | ............................... | 349/58 |
| 2006/0215073 A1 * | 9/2006 | Liao | ............................... | 349/58 |
| 2007/0030410 A1 * | 2/2007 | Cheng | ............................ | 349/58 |
| 2010/0097540 A1 * | 4/2010 | Shen | .............................. | 349/60 |
| 2010/0165228 A1 * | 7/2010 | Shen | .............................. | 349/58 |

* cited by examiner

*Primary Examiner* — Lisa Lea Edmonds

(57) ABSTRACT

A liquid crystal display with a height adjustable base assembly includes a base, a main arm, which is provided with a pivotal connection with the base and has slide rails, a panel fixing frame, which is capable of ascending and descending along the slide rails of the main arm and has a lock rod. A plumbing stop block is pivotally connected to the main arm to correspond to the lock rod. When the main arm rotates a preset inclining angular position with respect to the base, the plumbing stop block is urged to rotate by the gravity thereof for the lock rod being pushed to engage with the locating groove of the plumbing stop groove such that the operation of lifting the panel fixing frame with respect to the main arm is locked. Hence, the liquid crystal panel bouncing outward suddenly during unpacked is avoided to secure the safety with convenient operations.

18 Claims, 8 Drawing Sheets

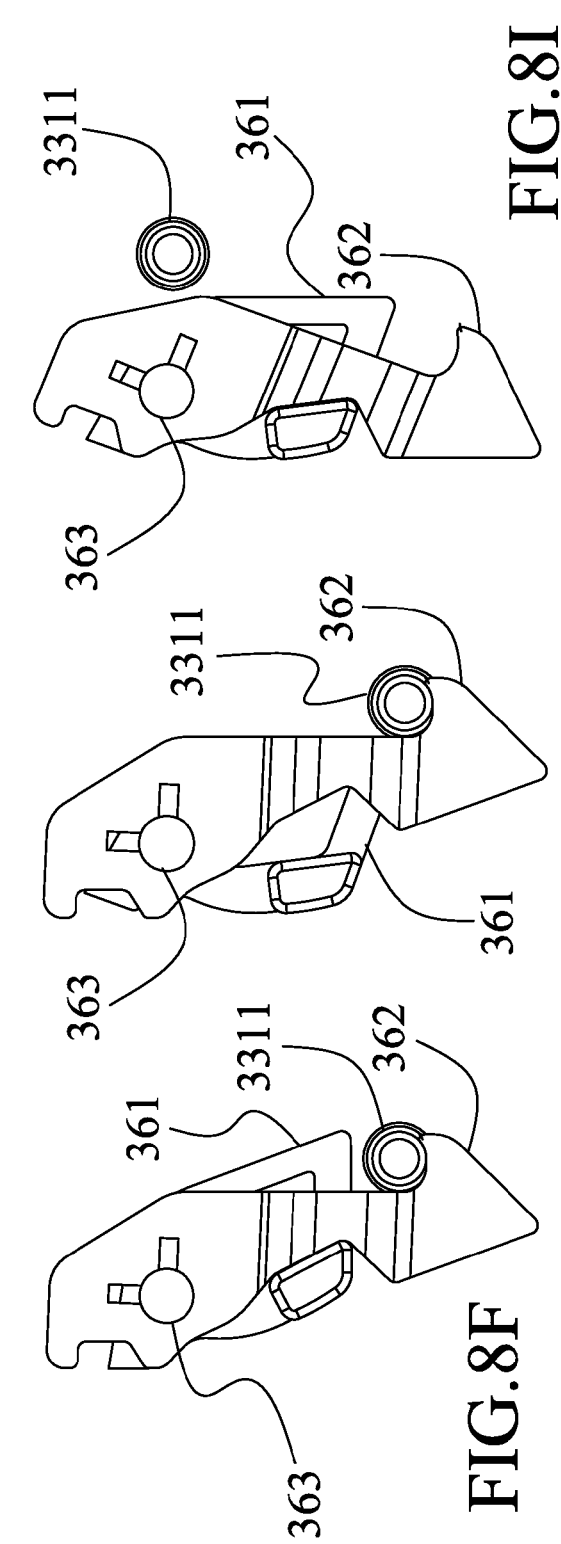

LIQUID CRYSTAL DISPLAY WITH A HEIGHT ADJUSTABLE BASE FOR THE PANEL THEREOF

BACKGROUND OF THE INVENTION

1. Field of the Invention

The present invention is related to a liquid crystal display, and particularly to a liquid crystal display with a height adjustable base incorporating with a function of locking the ascending and descending movements.

2. Brief Description of the Related Art

Due to the information technology being developed rapidly, the monitor with screen display is widely applied for showing pictures such as graphical images. The traditional cathode ray tub (CRT), which had been popularly used for a long time, has been largely replaced with the liquid crystal display (LCD), which is light in weight and thin in thickness.

In order to allow the height or the inclining angle of the liquid crystal panel on the liquid crystal display placed on the desktop being adjustable according to the preference of the user, it is necessary to have an adjustment device on the liquid crystal display for meeting the need of the user from the standpoint of the comfortable operation.

The conventional height adjustable base on the liquid crystal display offers an upward elastic force with a constant force spring. Because the locating of the height adjustable base is achieved by means of the gravity of the liquid crystal panel balancing with the upward elastic force of the constant force spring, the upward and downward movements of the height adjustable base work normally only if the liquid crystal display is operated normally. The liquid crystal panel usually moves downward to the lowest position with a forward inclining angle 90° before the liquid crystal display is packed for delivering. But, it is very possible that the liquid crystal panel bounces outward suddenly to hurt people at the time of the liquid crystal display being unpacked. Hence, how to avoid the preceding deficiency and secure the safety of the people is a subject worth us to investigate thoroughly.

SUMMARY OF THE INVENTION

Accordingly, an object of the present invention is to provide a liquid crystal display with a height adjustable base, which has a function for locking ascending and descending movements, such that when the liquid crystal panel inclines forward an angular displacement greater than a certain angle, the operation of the liquid crystal panel being lifted and moving down can be locked for facilitating the liquid crystal display being unpacked and preventing the liquid crystal panel from bouncing outward suddenly and to enhance the convenience of the operation.

In order to achieve the preceding object, a liquid crystal display with a height adjustable base for the panel thereof according to the present invention includes a liquid crystal display and a height adjustable base, and the height adjustable base further includes a base, a main arm, a panel fixing frame and a plumbing stop block.

Wherein, the main arm has a pivotal connection with the base and has a slide rail at two opposite lateral sides thereof respectively; the panel fixing frame is mount with the liquid crystal panel has a locating groove and is capable of offering the liquid crystal panel to slide upward or downward along the rail, and is positioned with the upward elastic force of the panel fixing frame balancing with the gravity of the liquid crystal panel; a lock rod is disposed on the panel fixing frame, and the plumbing stop block is pivotally connected to the main arm at a position corresponding to the lock rod and has a locating groove for engaging with the lock rod, which is urged to enter the locating groove with the plumbing stop block rotating due to the gravity itself, when the main arm rotates to incline a preset angle such that the operation for lifting the main arm is locked by the panel fixing frame.

In the preferred embodiment of the present invention, the plumbing stop block of the height adjustable base assembly further comprises an upper block pivotally connecting with the main arm with an upper groove seat at the upper block and a lower block at the lower block corresponding to the upper groove seat for forming the locating groove.

In the preferred embodiment of the present invention, the height adjustable base assembly further comprises a rail seat and a connecting rod device, wherein the rail seat is attached to said main arm corresponding to the plumbing stop block for a connecting rod rail being formed between the rail seat and the main arm, and the connecting rod device is disposed on the connecting rod rail for the rotational inclining movement of the main arm being converted to a reciprocal movement along the connecting rod rail to press against or depart from the plumbing stop block for preventing the function for locking the movement from ineffectiveness at the time of the plumbing stop block rotating along with the angular position of the liquid display being rotated.

In the preferred embodiment of the present invention, the connecting rod device of the height adjustable base assembly further comprises a stop lever, a compression spring and a flexible line, wherein the stop lever has a lever head and a lever body connecting with the lever head, the lever body is disposed in the connecting rod rail to move upward or downward along the connecting rod rail for the lever head pressing against or departing from the plumbing stop block; the compression spring is disposed to surround the lever body between the lever head and the rail seat to offer the push force of the reciprocal movement; and the flexible line with two ends thereof is attached to the base and the lever body, respectively for offering the pull force of the reciprocal movement.

In the preferred embodiment of the present invention, the lever head of the height adjustable base assembly has a slant to press against the plumbing stop block for resisting the plumbing stop block from moving rotationally.

In the preferred embodiment of the present invention, the connecting rod device of the height adjustable base assembly further comprises a flexible line guide rail for the flexible line moving reciprocally along the flexible line guide rail and offering the flexible line being attached to the base at a position flexible.

In the preferred embodiment of the present invention, the preset angular displacement of the main arm with respect to the base is less than 30° for the operation of locking the upward and downward movements works well.

In the preferred embodiment of the present invention, the plumbing stop block of the height adjustable base is pierced with a stop pin and secured with a C-shaped retaining ring for being pivotally connected to the main arm, and the upward elastic force for pushing the panel fixing frame is offered with the constant force spring on the main arm.

When the liquid crystal display in a state of normal use, the liquid crystal panel is braked with the inclinable connection mechanism and is operated between an inclining forward 5° and an inclining rearward 25°. Meanwhile, due to the angular displacement of the plumbing stop block, there is a distance between the plumbing stop block and the lock rod such that the lock rod is incapable of entering the locating groove of the plumbing stop block and the normal operation of the upward and downward movements works well.

Besides, when the liquid crystal display being packed, the liquid crystal panel is rotated to incline forward an angle not less than 30° (generally the angle is 90°). Right at this time, the plumbing stop block has rotated already and plumbed to a position below the lock rod when the liquid crystal panel is moved toward the base such that the lock rod can engage with the locating groove of the plumbing stop block to lock the operation of the upward and downward movements for avoiding the liquid crystal panel bouncing outward to hurt people at the time of unpacking the liquid crystal display.

After the liquid crystal display of the invention is unpacked and taken out and the forward inclining angle of the liquid crystal panel is adjusted to less than 30° (or inclining backward), the liquid crystal panel can be pressed downward lightly and the plumbing stop block rotates to the original position to depart from the lock rod a distance due to the gravity thereof such that the function for ascending and descending the liquid crystal panel can be resumed automatically with safety and convenience.

BRIEF DESCRIPTION OF THE DRAWINGS

The detail structure, the applied principle, the function and the effectiveness of the present invention can be more fully understood with reference to the following description and accompanying drawings, in which:

FIG. 8A to 8I are plan views illustrating the operation of locking the height adjustable base assembly of a liquid crystal display according to the present invention.

DETAILED DESCRIPTION OF THE INVENTION

Figure 1:
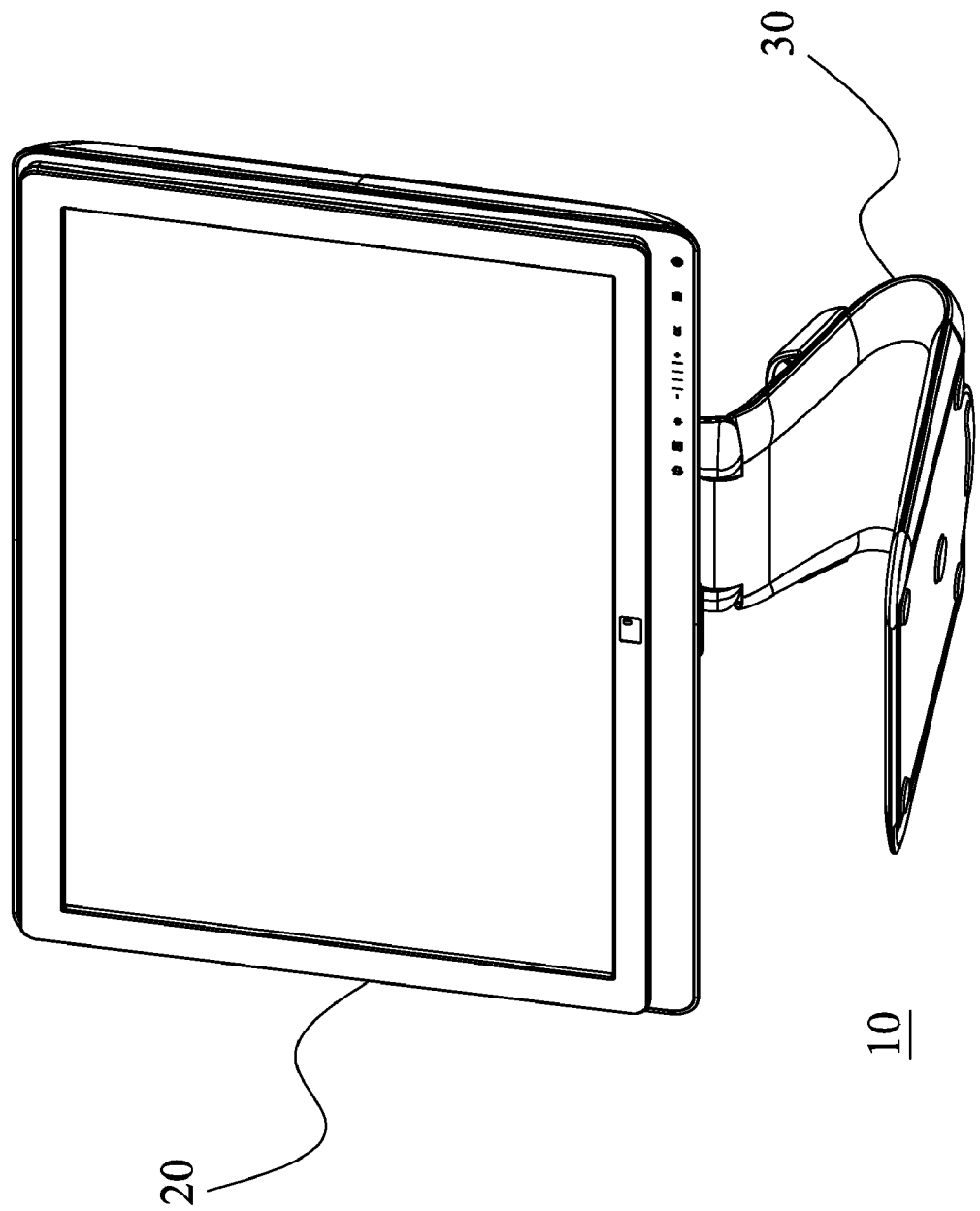
FIG. 1 is a perspective view of a liquid crystal display according to the present invention.
Figure 2:
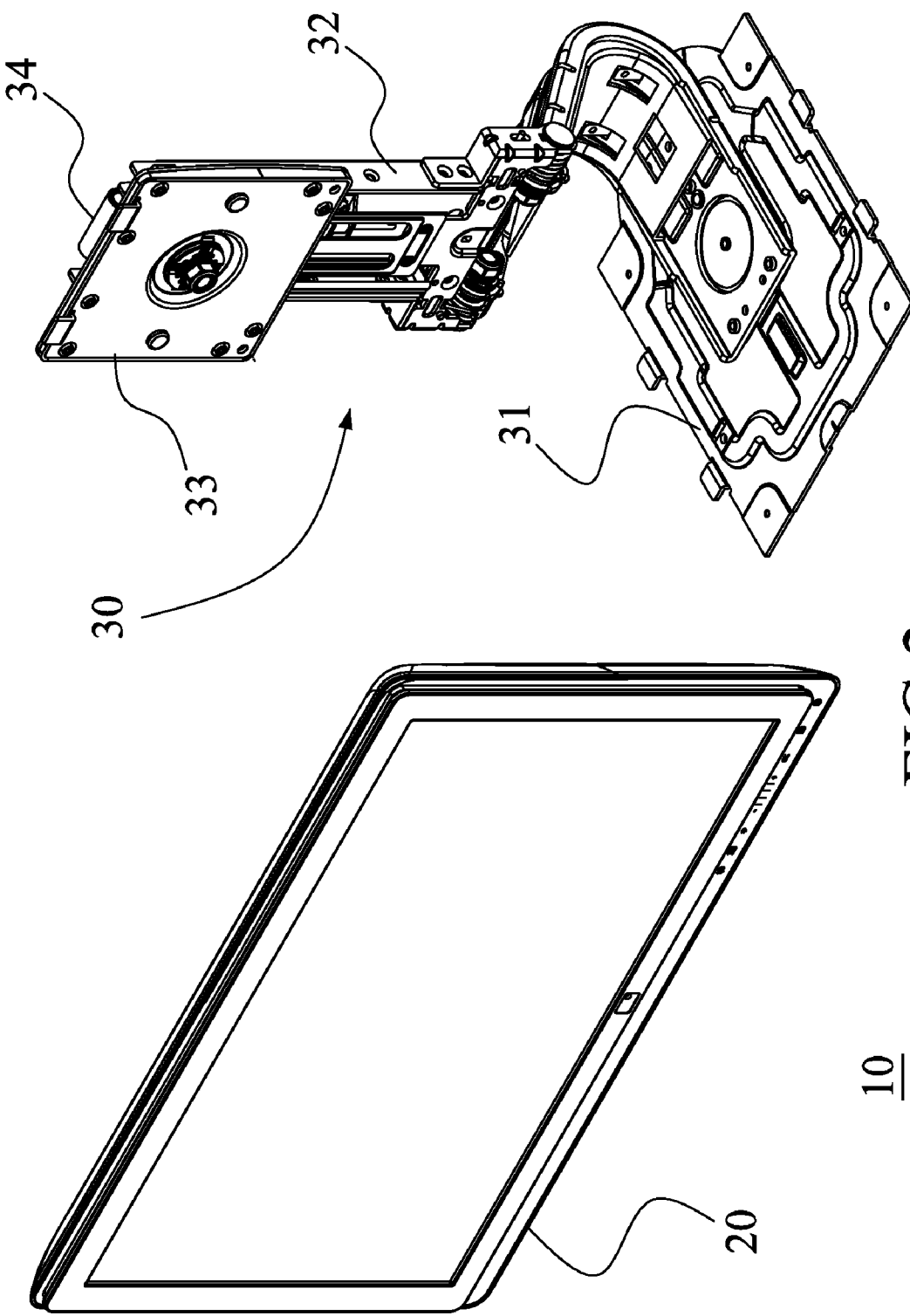
FIG. 2 is a partial disassembled perspective view of the liquid crystal display shown in FIG. 1.

Referring to FIGS. 1 to 6, a liquid crystal display 10 in a preferred embodiment according to the present invention includes a liquid crystal panel 20 and a height adjustable base assembly 30. The height adjustable base assembly 30 is composed of a base 31, a main arm 32, a panel fixing frame 33, a constant force spring 34, a plumbing stop block 36, a rail seat 323 and a connecting rod device 35. Although it is shown in the figures that the rail seat 323 is fastened to the main arm 32, alternatively, the rail seat 323 can be made integrally with the main arm 32. Besides, the base 31 can be provided with a plastic cover for enhancing the good outer look thereof and a reinforcing plate for reinforcing the strength thereof (not shown). The liquid crystal panel 20 is fastened to the panel fixing frame 33 of the height adjustable base 30 with screws.

In order to offer the user more flexible applications, the panel fixing frame 33 consists of a lifted seat 331, which is capable of moving upward and downward along the main arm 32, and a panel rotational seat 332, which is braked with a braking device and pivotally joined to the lifted seat 331. The liquid crystal panel 20 can be fastened to the panel rotational seat 332 with screws for the user being able to turn and adjust the angular position of the liquid crystal panel 20 depending on the picture shown on the liquid crystal panel 20.

Figure 3:
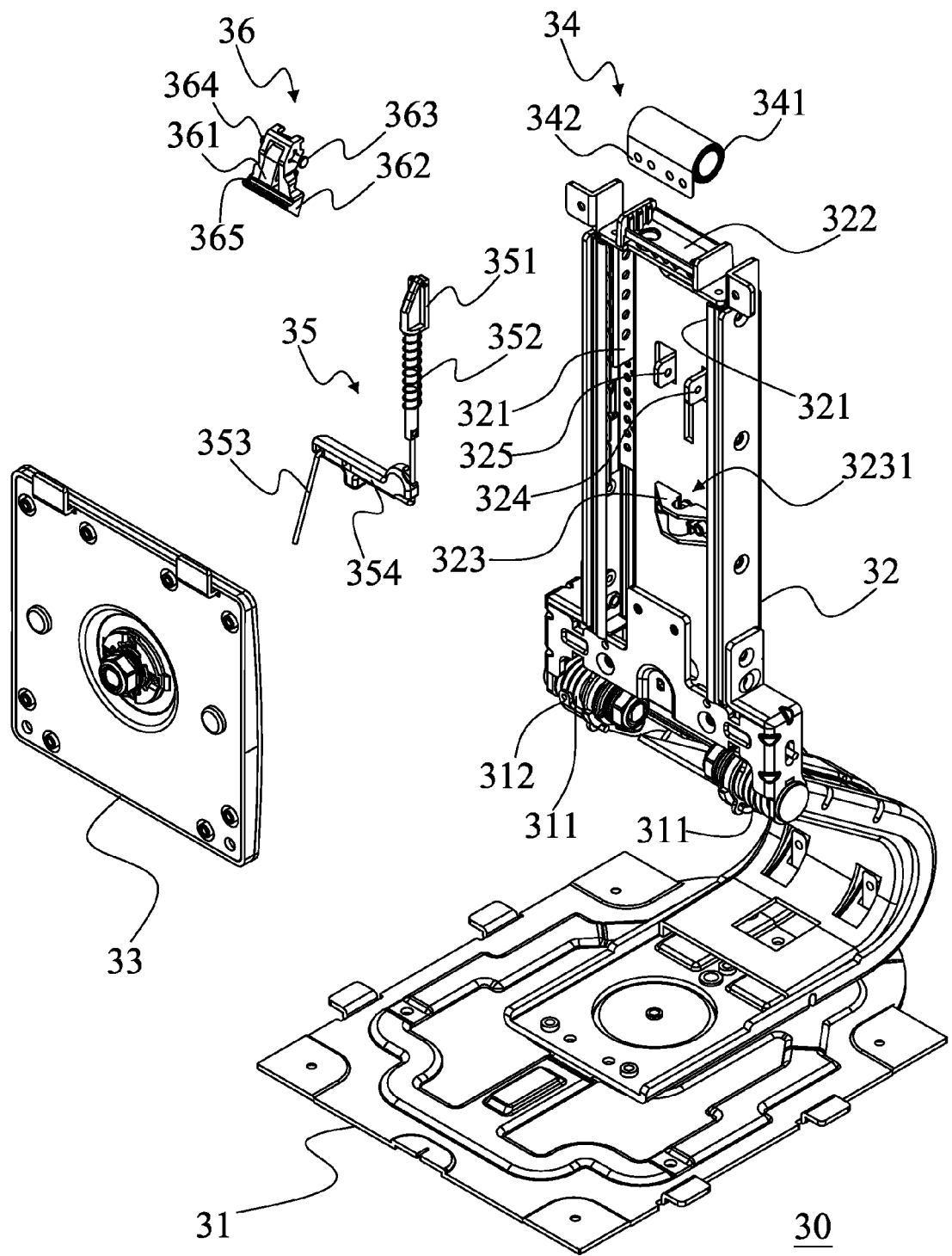
FIG. 3 is an exploded perspective view of the height adjustable base shown in FIG. 2.

Referring to FIG. 3, the main arm 32 at two opposite corners of the lower end thereof is disposed with a torsion spring 311 respectively incorporated with the braking device, which is composed of such as a spring washer and an angular positioning plate 312. In this way, the main arm 32 is capable of being operated to have an inclining angle with respect to the base 31 between a forward inclining angle 90° and a rearward inclining angle 25°. Two long lateral sides of the main arm 32 are provided with a slide rail 321 respectively. The slide rail 321 is composed of a stationary member and a movable member, and the stationary member has steel balls for the movable member capable of moving along the steel balls. The lifted seat 331 provides two lateral walls 3312 to be fastened to the movable member of the respective slide rail 321 for the liquid crystal panel 20 being lifted along the slide rails 321. Besides, the lifted seat 331 has a lock rod 3311 (see FIG. 4) to lock the operation of lifting.

Figure 4:
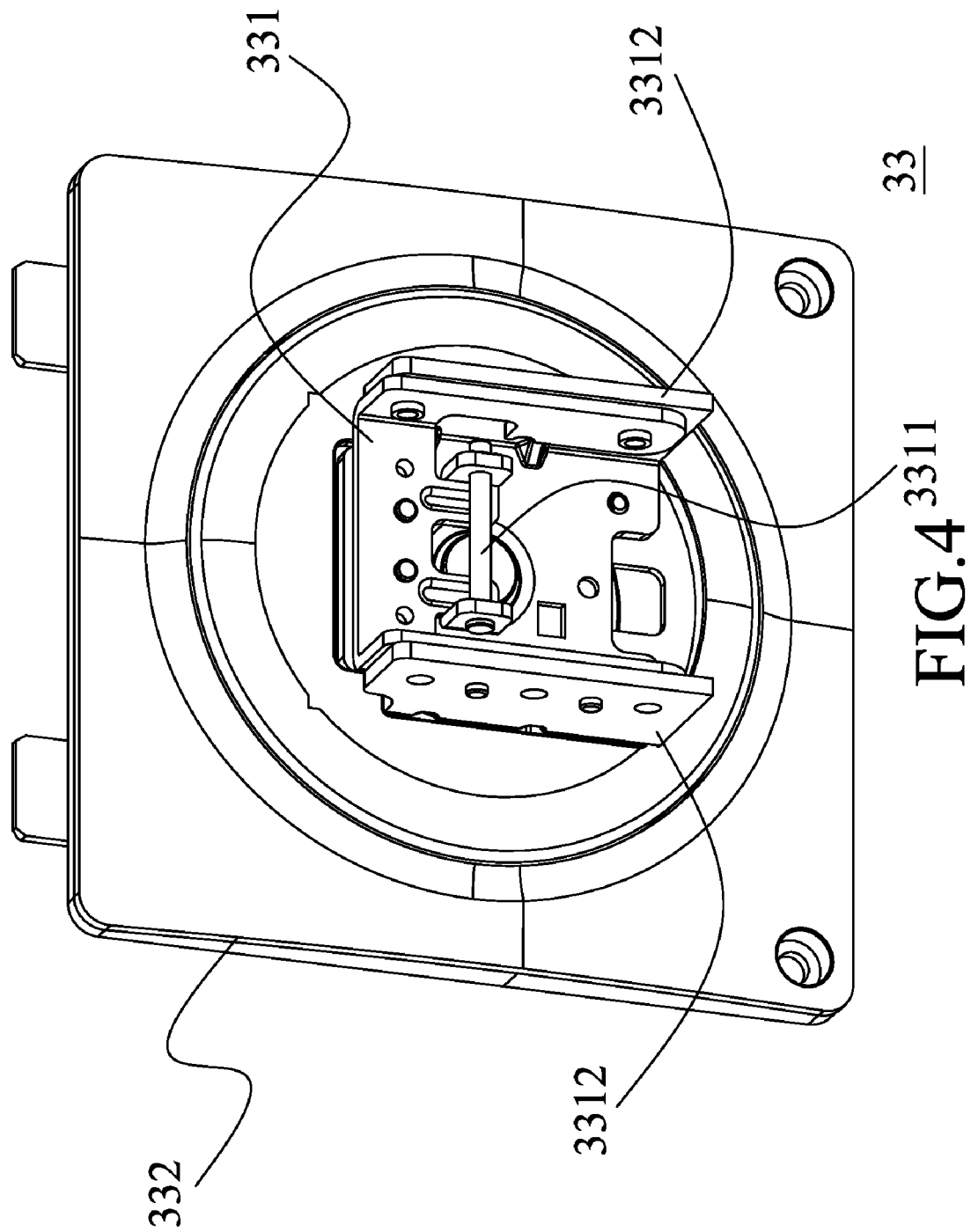
FIG. 4 is another perspective view of the height adjustable rotational main shaft shown in FIG. 3.

It can be seen in FIGS. 3 and 4 that the liquid crystal panel 20 can be positioned with an upward elastic force offered by the constant force spring 34 balancing with the gravity of the liquid crystal panel 20 after being lifted to a certain height. The movable end 341 of the constant force spring 34 is received in a constant force spring seat 322 of the main arm 32 and the stationary end 342 of the constant force spring 34 is fastened to the upper end of the lifted seat 331 on the panel fixing frame 33 such that a sufficient upward elastic force can be offered to balance with the gravity of the liquid crystal panel 20 when the panel fixing frame 33 moves downward.

Figure 8A:
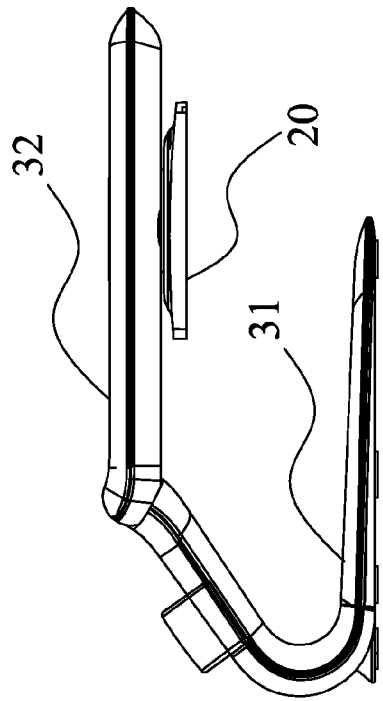
Figure 8B:
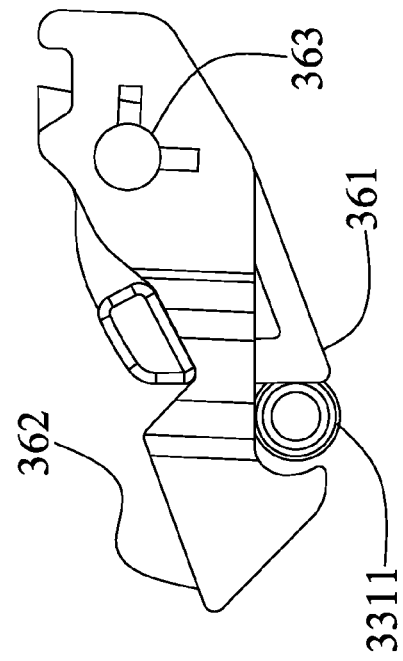
Figure 8C:
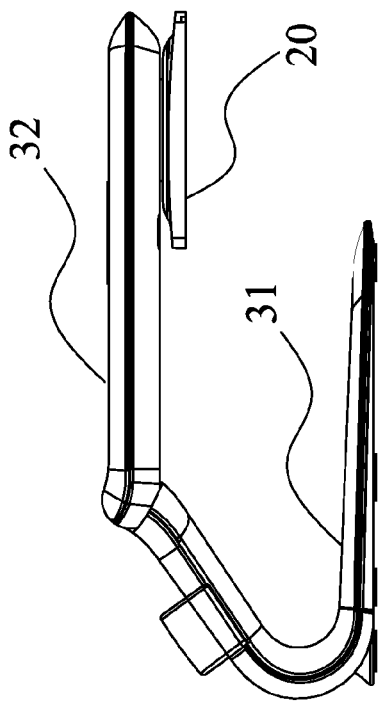
Figure 8D:
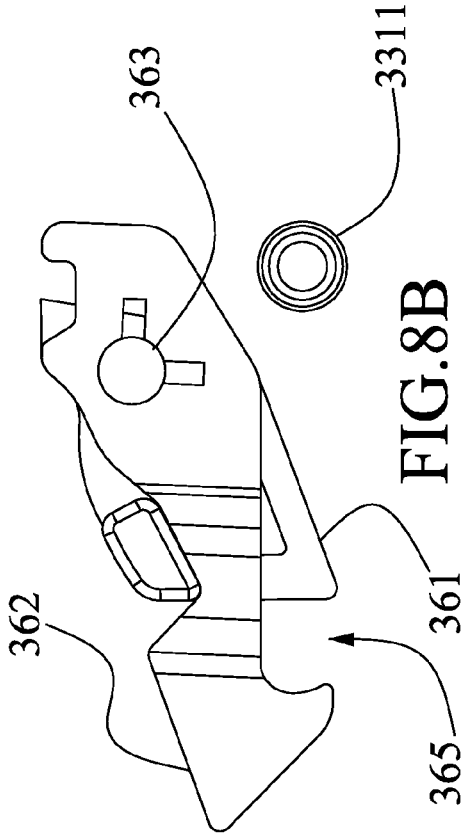

In addition, in order to lock the lifting operation of the panel fixing frame 33 with respect to the main arm 32 after the main arm 21 rotating a preset inclining forward angle such as an angle is not less than 5° relative to the base 31, the plumbing stop block 36, which is disposed at the lift-locking rod 3311, rotates in accordance with the gravity at the time of the main arm 32 inclining rotationally to urge the lock rod 3311 to enter the locating groove 365 provided in the plumbing stop block 36 (see FIGS. 8B and 8D). In this way, the operation of moving the panel fixing frame 33 with respect to the main arm 32 is locked. The detail principle for locking the lifting operation of the panel fixing frame 33 with respect to the main arm 32 will be recited hereinafter.

Figure 5:
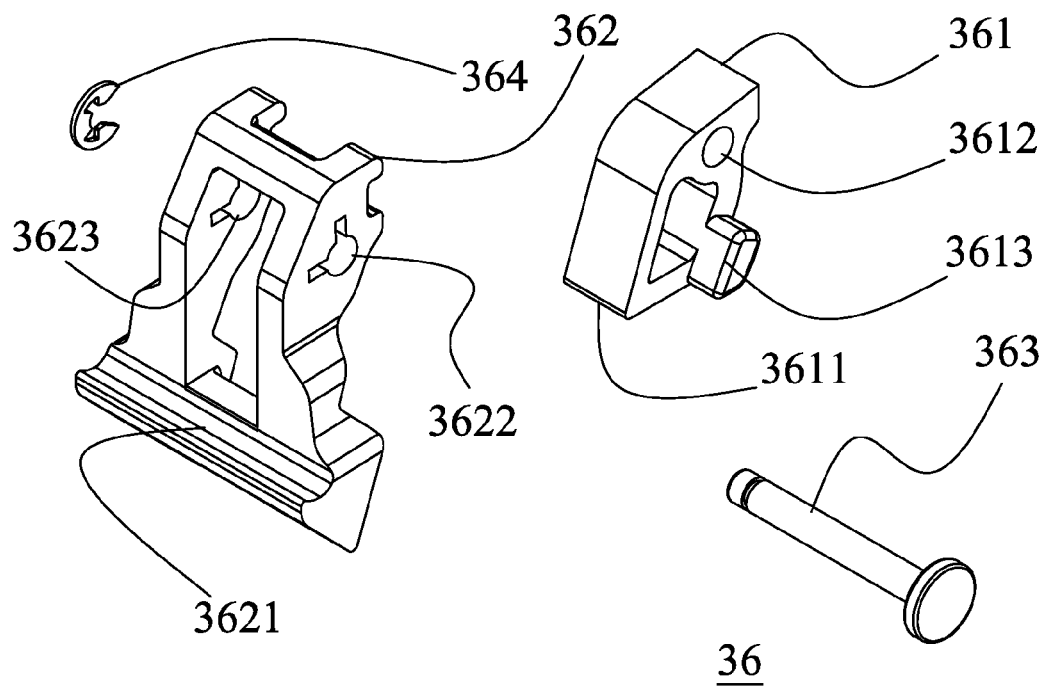
FIG. 5 is an exploded perspective view of the stop block shown in FIG. 3.

Referring to FIG. 5, the plumbing stop block 36 includes an upper block 361, a lower block 362 and a block pin 363. The upper block 361 has an upper through hole 3612 and the lower block 362 has two lower through holes 3622, 3623 corresponding to the upper through hole 3612. The main arm 32 has two locating holes 324, 425. The block pin 363 passes through the first locating hole 324, the first lower through hole 3622, the upper through hole 3612, the second lower through hole 3622, and the second locating hole 325. Then, a C-shaped retaining ring 364 engages with the tail end of the block pin 363. In this way, the plumbing stop block 36 can be pivotally attached to the main arm 32. Hence, when the main arm 32 rotationally inclines with respect to the base 31, the plumbing stop block 36 is capable of rotating corresponding to the gravity thereof to urge the lock rod 3311 to engage with the locating groove part 365 of the plumbing stop block 36.

Wherein, the upper block 361 has an upper grooved seat 3611 and the lower block 362 has a lower grooved seat 3621 corresponding to the upper grooved seat 3611 such that the locating groove part 365 is formed when the upper grooved seat 3611 fits with the lower grooved seat 3621. The actuation of the pluming stop block 36 for the lock rod 3311 for engaging with the locating groove part 365 and performing the operation of locking is described in detail hereinafter with FIGS. 8A to 8I.

Referring to FIGS. 8A to 8D, when the main arm 32 rotationally inclines to 90° with respect to the base 31, the upper block 361 and the lower block 362 rotate with respect to the block pin 363 due to the gravity thereof to droop the locating groove part 365 below the position of the lift-locking rod 3311 as shown in FIGS. 8A and 8B. Right at the time, the user can push the liquid crystal panel 20 toward the base 31 to move the lock rod 3311 to enter the locating grooved part 365 as shown in FIGS. 8C and 8D such that the operation of upward and downward movements of the liquid crystal panel 20 with respect to the main arm 32 is locked.

Referring to FIGS. 8E to 8I, when the main arm 32 is rotated to the original normal inclining position with respect to the base 31, the lock rod 3311 presses against the upper block 361 of the plumbing stop block 36 such that the upper block 361 is incapable of restoring to the original plumbing position in time in accordance with the change of gravity. Furthermore, the lower block 362 of the plumbing stop block 36 is resisted with a lateral projection 3613 of the upper block 361 (see FIG. 5) and incapable of restoring to the original plumbing position with the change of the gravity such that the operation for locking lift of the liquid crystal display 10 is still in a state of not being unlocked yet.

In order to unlock the operation of lifting the liquid crystal display 10 for the liquid crystal panel 20 being able to restore the function of upward and downward movements, simply presses the liquid crystal panel 20 downward lightly to allow the lock rod 3311 to move away the upper block 361 with pressing against the plumbing stop block 36. In this way, the upper block 361 and the lower block 362 can rotate due to the gravity as shown in FIGS. 8G to 8I such that the lock rod 3311 disengages from the locating groove part 365 to restore the function of upward and downward movements of the liquid crystal panel 20 with respect to the main arm 32.

As the foregoing, the operation for lifting the liquid crystal display 10 being locked or unlocked is achieved by means of the change of the position of the lock rod 3311 relative to the plumbing stop block 36 under a condition of normal use. Nevertheless, the plumbing stop block 36, which is pivotally attached to the main arm 32, works normally depending on the direction of the gravity thereof changing correctly. If the liquid crystal display 10 is in a state of abnormal use, it is very likely that a problem of angular position of the liquid crystal display 10 results in the function of the upward and downward movements being unlocked unexpectedly.

For instance, in case of the state of locking as shown in FIGS. 8C and 8D, the liquid crystal display 10 is rotated 180° to allow the directions of both the liquid crystal panel 20 and the base 31 are inverted to each other such that the plumbing stop block 36, which is pivotally connected to the main arm 32, probably rotates and leads to the lock rod 3311 departing from the locating groove 365 due to the direction of the gravity of the plumbing stop block 36 changing. Under this circumstance, the operation of locking the lift for the liquid crystal display 10 is unlocked unexpectedly.

Figure 6:
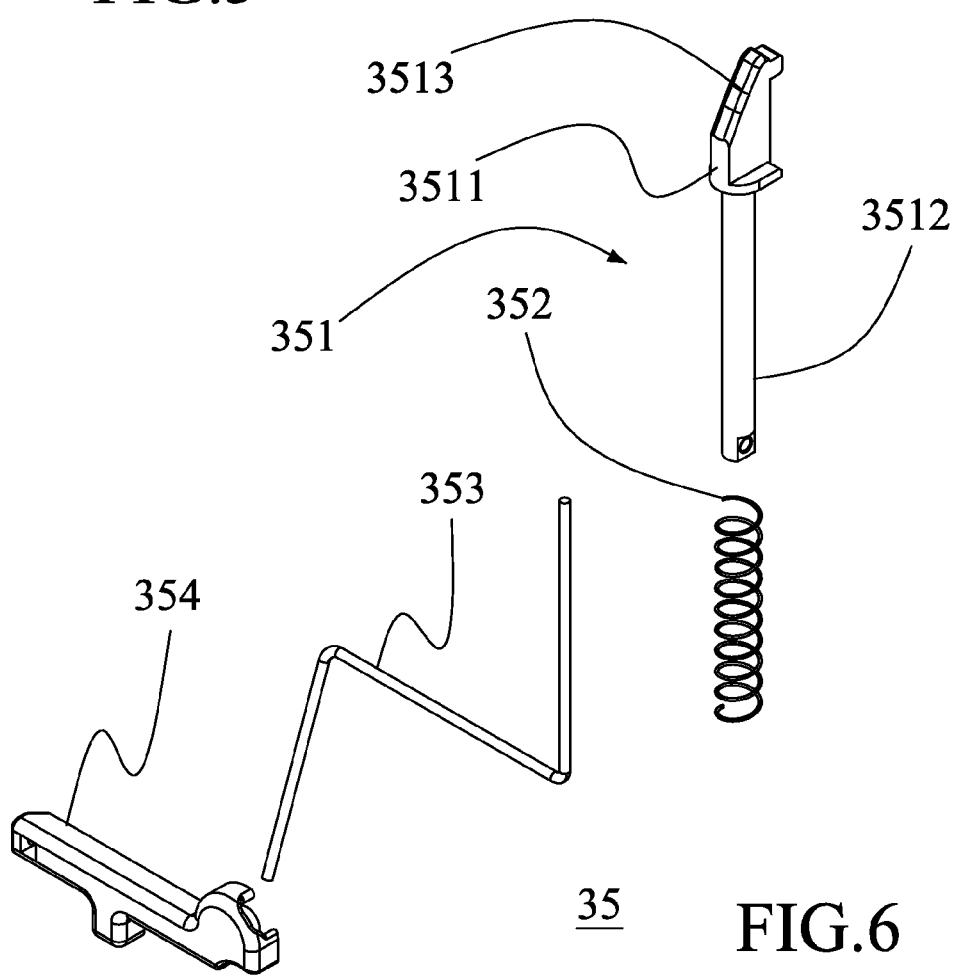
FIG. 6 is another perspective view of the linkage device shown in FIG. 3.

In order to prevent the operation of locking the upward and downward movements of the liquid crystal display 10 from being unlocked unexpectedly, the height adjustable base assembly 30 further provides the rail seat 323, which has been mentioned previously and illustrated in FIG. 3, at the main arm 32 and a connecting rod device 35, which includes a stop lever 351, a compression spring 352, a flexible line 353 and a guide rail 354 as shown in FIGS. 3 and 6. Of course, as persons familiar to the art know, the rail seat 323 and the connecting rod device 35 can be arranged to change the rotational movement of the main arm 32 with respect to the base 31 to a reciprocal movement with any linkages instead.

It can be seen in FIGS. 3 and 6 that the rail seat 323 is attached to the main arm 32 such that a connecting rod rail 3231 between the rail seat 323 and the main arm 32 is formed corresponding to the plumbing stop block 36. The lever body 3512 of the stop lever 351 is disposed in the connecting rod rail 3231 and move upward or downward along the connecting rod rail 3231. Further, the plumbing stop block 36 is prohibited from rotating when a lever head 3511 of the lever body 3512 pressing against the plumbing stop block 36, and is allowed to rotate when the lever head 3511 departs from the plumbing stop block 36. In order to enhance the effect of pressing against the plumbing stop block 36, the lever head 3511 is provided with a slant 3513.

An end of the flexible line 353 is tied to the lower end of the lever body 3512 of the stop lever 351 and another end of the flexible line 353 is tied to an orientation locating plate 312 shown in FIG. 3 after passing through the guide rail 354 such that the flexible line 353 in association with the compression spring 352, which is disposed to surround the lever body 3512 between the lever head 3511 and the rail seat 323, to offer a push force and a pull force of the reciprocal movement of the stop lever 351 respectively.

Wherein, the flexible line 353 can be such as a steel wire, metal chain, plastic cord or a nylon cord with a strength at least overcoming the elastic force of the compression spring 352 and without being excessively extended or broken. The flexible line 353 employed in the preferred embodiment is a KEVLAR® fiber cord made by DuPont Co. The guide rail 354 is used for an end of the flexible line 353 being guided to tie with the orientation locating plate 312 of the base 31. The guide rail 354 can be omitted if the flexible line 353 is designed to tie to the base 31 directly.

When the liquid crystal display 10 is operated normally, the inclining angle of the main arm 32 with respect to the base 31 usually is less than 30°. Because the flexible line 353 is in a state of being tightly pulled, the lever body 3512 of the stop lever 351 is pulled downward to depart the lever head 3511 departs from the plumbing stop block 36 for maintaining the normal operation of locking the lift of the liquid crystal display 10.

In addition, when the main arm 32 is rotated and taken up for rotating an inclining angle greater than 30°, the flexible line 353 is in a state of being released and an end thereof presses against the compression spring 352 on the rail seat 323. Under this circumstance, another end of the flexible line 353 pushes the lever head 3511 to result in the slant 3513 at the lever head 3511 presses against the plumbing stop block 36 for preventing the function of locking the liquid crystal display 10 from being unlocked unexpectedly.

Figure 7:
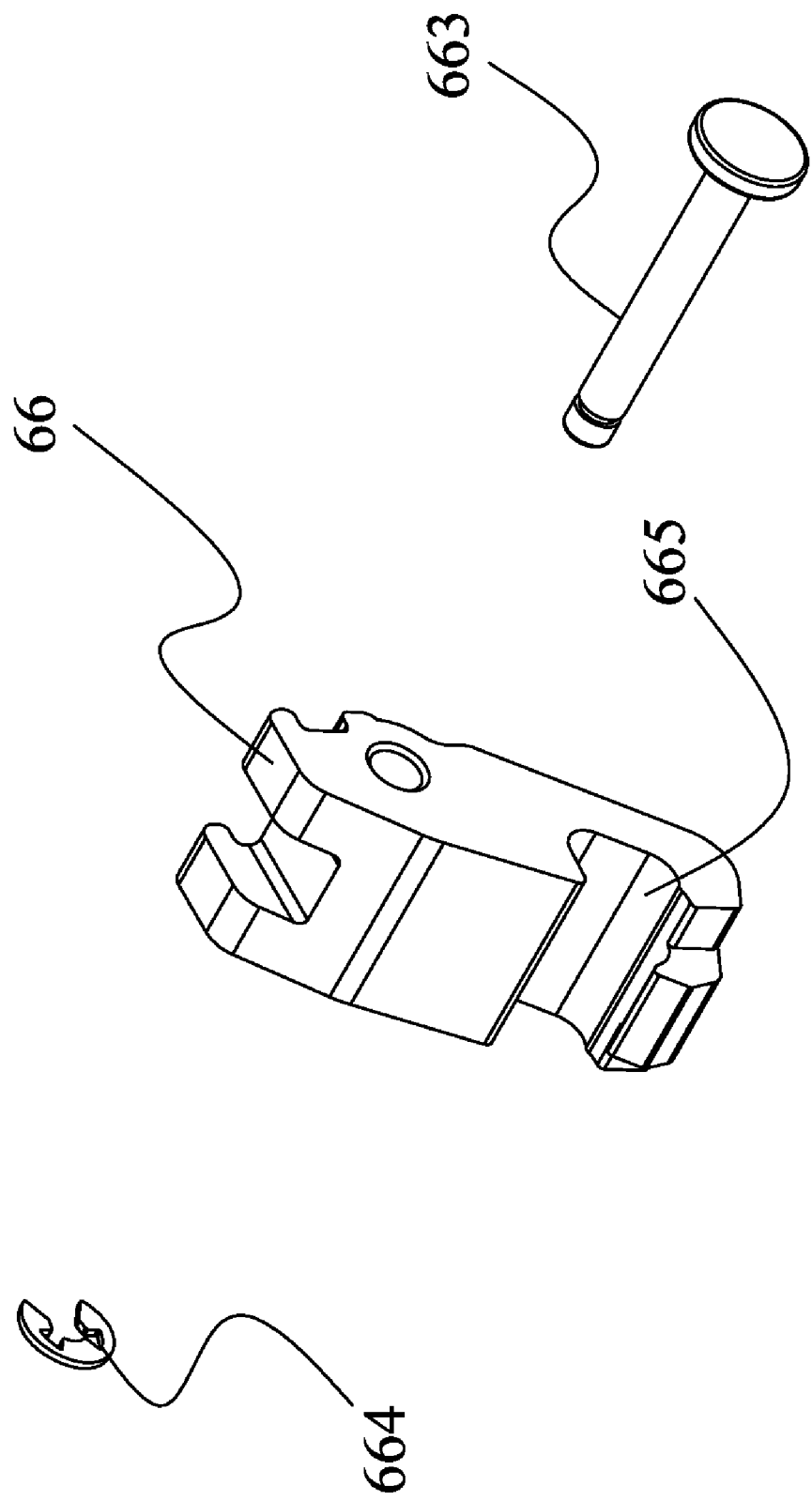
FIG. 7 is a perspective view of the plumbing stop block in the another embodiment of the present invention.

Referring to FIG. 7, although the height adjustable base assembly 30 has a block pin 363, a C-shaped retaining ring 364 and a plumbing stop block 36 containing the upper block 361 and the lower block 362 accompanying the lock rod 3311 on the lifted seat 331 of the panel fixing frame 33 to perform the function for locking the lift of the liquid crystal display 10, persons familiar to the art should know that the plumbing stop block 66 with a locating groove 665, a stop block pin 663 and a C-shaped retaining ring 664 shown in FIG. 7 being used instead of the plumbing stop block 36 for matching with the lock rod 3311 on the lifted seat 331 of the panel fixing frame 33 can perform the function for locking the lift of the liquid crystal display 10 as well. Alternatively, other types of plumbing stop block, which has the upper and lower block as the plumbing stop block 36 does with a little difference from the plumbing stop block 36 in configuration, structure and relative position, work as well if the locating groove is provided corresponding to the lock rod 3311.

While the invention has been described with referencing to the preferred embodiments thereof, it is to be understood that modifications or variations may be easily made without departing from the spirit of this invention, which is defined by the appended claims.

What is claimed is:

1. A liquid crystal display comprising:
   a liquid crystal panel;
   a base;
   a main arm pivotally connecting with said base, being capable of rotating and inclining with respect to said base, and having a slide rail;
   a panel fixing frame being mount with said liquid crystal panel, being capable of ascending and descending along said rail, having a lock rod, and being pushed with an upward elastic force to balance the gravity of said liquid crystal panel; and
   a plumbing stop block pivotally connecting with said main arm to correspond to said lock rod, and having a locating groove;
   wherein said plumbing stop block is urged to rotate by its gravity at the time of said main arm rotating a preset angular displacement with respect to said base for said lock rod being capable of engaging with said locating groove such that an operation for locking a lift of said panel fixing frame with respect to said main arm is performed.

2. The liquid crystal display as defined in claim 1, wherein said plumbing stop block further comprises:
   an upper block pivotally connecting with said main arm and having an upper groove seat; and
   a lower block pivotally connecting with said main arm and having a lower groove seat corresponding to said upper groove seat;
   wherein said locating groove is formed with said upper block and said lower block.

3. The liquid crystal display as defined in claim 1 further comprises:
   a rail seat being attached to said main arm corresponding to said plumbing stop block for a connecting rod rail being formed between said rail seat and said main arm; and
   a connecting rod device being disposed on said connecting rod rail for said main arm inclining to perform a rotational movement with respect to said base being converted to a reciprocal movement along said connecting rod rail to press against or depart from said plumbing stop block.

4. The liquid crystal display as defined in claim 3, wherein said connecting rod device further comprises:
   a stop lever having a lever head and a lever body connecting with said lever head, wherein said lever body is disposed in said connecting rod rail to move upward or downward along said connecting rod rail for said lever head pressing against or departing from said plumbing stop block;
   a compression spring being disposed said lever body between said lever head and said rail seat; and
   a flexible line with two ends thereof being attached to said base and said base and said lever body, respectively.

5. The liquid crystal display as defined in claim 4, wherein said lever head has a slant.

6. The liquid crystal display as defined in claim 4, wherein said connecting rod device further comprises a flexible line guide rail for said flexible line moving reciprocally along said flexible line guide rail.

7. The liquid crystal display as defined in claim 1, wherein said preset angular displacement of said main arm with respect to said base is less than 30°.

8. The liquid crystal display as defined in claim 1, wherein said plumbing stop block is pierced with a stop pin and secured with a C-shaped retaining ring for being pivotally connected to said main arm.

9. The liquid crystal display as defined in claim 1 further comprises a constant force spring disposed on said main arm for offering said lift elastic force.

10. A height adjustable base assembly, which is suitable for a liquid crystal display with a liquid crystal panel, comprising
   a base;
   a main arm pivotally connecting with said base, being capable of rotating and inclining with respect to said base, and having a slide rail;
   a panel fixing frame being mount with said liquid crystal panel, being capable of ascending and descending along said rail, having a lock rod, and being pushed with an upward elastic force to balance the gravity of said liquid crystal panel; and
   a plumbing stop block pivotally connecting with said main arm to correspond to said lock rod, and having a locating groove;
   wherein said plumbing stop block is urged to rotate by its gravity at the time of said main arm rotating a preset angular displacement with respect to said base for said lock rod being capable of engaging with said locating groove such that an operation for locking a lift of said panel fixing frame with respect to said main arm is performed.

11. The liquid crystal display as defined in claim 10, wherein said plumbing stop block further comprises:
   an upper block pivotally connecting with said main arm and having an upper groove seat; and
   a lower block pivotally connecting with said main arm and having a lower groove seat corresponding to said upper groove seat;
   wherein said locating groove is formed with said upper block and said lower block.

12. The liquid crystal display as defined in claim 10 further comprises:
   a rail seat being attached to said main arm corresponding to said plumbing stop block for a connecting rod rail being formed between said rail seat and said main arm; and
   a linkage device being disposed on said connecting rod rail for said main arm inclining to perform a rotational movement with respect to said base being converted to a reciprocal movement along said connecting rod rail to press against or depart from said plumbing stop block.

13. The liquid crystal display as defined in claim 12, wherein said connecting rod device further comprises:
   a stop lever having a lever head and a lever body connecting with said fever head, wherein said lever body is disposed in said connecting rod rail to move upward or downward along said connecting rod rail for said lever head pressing against or departing from said plumbing stop block;
   a compression spring being disposed said lever body between said lever head and said tail seat; and
   a flexible line with two ends thereof being attached to said base and said base and said lever body, respectively.

14. The liquid crystal display as defined in claim 13, wherein said lever head has a slant.

15. The liquid crystal display as defined in claim 13, wherein said connecting rod device further comprises a flexible line guide rail for said flexible line moving reciprocally along said flexible line guide rail.

16. The liquid crystal display as defined in claim 10, wherein said preset angular displacement of said main arm with respect to said base is less than 30°.

17. The liquid crystal display as defined in claim 10, wherein said plumbing stop block is pierced with a stop pin and secured with a C-shaped retaining ring for being pivotally connected to said main arm.

18. The liquid crystal display as defined in claim 10 further comprises a constant force spring disposed on said main arm for offering said lift elastic force.

* * * * *